(12) United States Patent
Ito (10) Patent No.: US 8,614,815 B2
(45) Date of Patent: Dec. 24, 2013

(54) IMAGE FORMING DEVICE, IMAGE FORMING SYSTEM, AND IMAGE FORMING METHOD FOR REDUCING THE CAPACITY OF PRINT DATA STORED IN A SERVER

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/687,870

(22) Filed: Jan. 14, 2010

(65) Prior Publication Data

US 2010/0182643 A1   Jul. 22, 2010

(30) Foreign Application Priority Data

Jan. 21, 2009   (JP) ................................. 2009-011325

(51) Int. Cl.
*G06F 3/12*   (2006.01)
(52) U.S. Cl.
USPC ........ 358/1.15; 358/1.13; 358/1.14; 358/1.16
(58) Field of Classification Search
USPC ................................................. 358/1.13–1.16
See application file for complete search history.

(56) References Cited

U.S. PATENT DOCUMENTS

| | | | |
|---|---|---|---|
| 6,667,810 B1* | 12/2003 | Jeyachandran et al. | 358/1.14 |
| 7,362,461 B2* | 4/2008 | Reddy et al. | 358/1.15 |
| 7,437,467 B2* | 10/2008 | Kato | 709/227 |
| 2003/0078965 A1* | 4/2003 | Cocotis et al. | 709/203 |
| 2004/0223177 A1* | 11/2004 | Takagi et al. | 358/1.13 |
| 2004/0252322 A1* | 12/2004 | Gassho et al. | 358/1.14 |
| 2006/0039029 A1* | 2/2006 | Yagita | 358/1.15 |
| 2007/0081186 A1 | 4/2007 | Numata | |
| 2007/0091361 A1* | 4/2007 | Matsugashita | 358/1.15 |
| 2008/0024818 A1 | 1/2008 | Ito | |
| 2008/0189716 A1* | 8/2008 | Nakahara | 718/105 |
| 2009/0190166 A1* | 7/2009 | Nakamura et al. | 358/1.15 |

FOREIGN PATENT DOCUMENTS

| | | |
|---|---|---|
| JP | 08-009121 | 12/1996 |
| JP | 2005-25450 | 1/2005 |
| JP | 2007-28109 | 2/2007 |
| JP | 2007-105937 | 4/2007 |
| JP | 2007-105937 A | 4/2007 |
| JP | 2008-134857 | 6/2008 |
| JP | 2008-165529 | 7/2008 |

OTHER PUBLICATIONS

Japanese Office Action dated Dec. 4, 2012 issued during prosecution of related Japanese Application No. 2009-011325.

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto (57) ABSTRACT

The present invention is to provide an image forming device, an image forming system, and an image forming method that provide greater convenience for users and minimize the capacity of print data to be stored in a server. The image forming device notifies a document information management server of "a deletion permitting instruction" of a document only when two conditions, i.e., "a record that a print job has been successfully completed" and "log out of a user", are acquired. After inputting a print job into the image forming device, a print server notifies the document information management server of "information that a print job has been input to a printer". The document information management server has a unit that performs a document deleting process only when two pieces of information, i.e., "the deletion permitting instruction" and "the information that a print job has been input to the printer", are acquired.

7 Claims, 8 Drawing Sheets

PRINT SERVICE

LIST OF DOCUMENTS TO BE DELETED

| DOCUMENT NAME | USER NAME | ENTRY DATE AND TIME |
|---|---|---|
| DOCUMENT A | 100 | 2008/01/01 12:00 |

◀ ▶

ARE YOU SURE TO DELETE THESE DOCUMENTS?

YES    NO

FIG.5

| PRINT RESULT | DOCUMENT ID | DOCUMENT NAME | USER NAME | PRINTED TIME | ...... |
|---|---|---|---|---|---|
| SUCCESS | 001 | DOCUMENT A | 100 | 12:00 | ... |
| UNSUCCESS | 002 | DOCUMENT G | 100 | 13:00 | ... |
| SUCCESS | 003 | DOCUMENT H | 200 | 14:00 | ... |
| ... | ... | ... | ... | ... | ... |

| DOCUMENT ID | DOCUMENT NAME | USER NAME | PRINT ENTRY TIME | ...... |
|---|---|---|---|---|
| 001 | DOCUMENT A | 100 | 12:00 | ... |

IMAGE FORMING DEVICE, IMAGE FORMING SYSTEM, AND IMAGE FORMING METHOD FOR REDUCING THE CAPACITY OF PRINT DATA STORED IN A SERVER

BACKGROUND OF THE INVENTION

1. Field of the Invention

The present invention relates to image forming devices, image forming systems, and image forming methods that select and print desired data from data held in an external storage device.

2. Description of the Related Art

Conventionally, there is known a printing system in which an image forming device, an information terminal device serving as its client, a bibliographic information server that stores and manages bibliographic information of print data, and an information processing device that stores the print data are connected to each other through a network. As the image forming device, an MFP (Multi-Function Peripheral) or an LBP (Laser Beam Printer) is used, for example. As the information terminal device, a PC (Personal Computer) is used, for example. As the information processing device that stores print data, a storage server is used, for example. Japanese Patent Laid-Open No. 2007-105937 discloses such a printing system.

In this printing system, a user stores print data from the PC to the storage server, and the storage server then registers the location of the print data in the bibliographic information server. The user selects the print data registered in the bibliographic information server via an operation panel of the MFP, and downloads and prints this data from the storage server.

The above-described pull-print system has an advantage that once a user registers print data in the pull-print system, the data can be printed from any image forming device according to the circumstances of the user or the congestion of the image forming device, thus improving the convenience for the user. Moreover, in printing, it is also possible to prevent theft of a print document because the user is close to the image forming device outputting the print document.

In the above-described printing system, the convenience or security of a user has been taken into consideration, however once the printing is completed in the image forming device, this print data is deleted from the storage server without determining whether the printing was successful or not. For this reason, if the printing was unsuccessful, the print data has to be registered in the storage server again, and therefore there is a problem that the convenience after printing has not been taken into consideration.

In order to solve this problem, Japanese Patent Laid-open No. H08-9121 (1996) discloses a mechanism of temporarily leaving the document in a server.

However, the above-described prior art has the following problems. That is, if print data is deleted from the storage server after a certain period of time although a user schedules printing of this data, then the printing is impossible. In order to print this data, a print job has to be input from a PC again. Moreover, if print data is temporarily left in the storage server, print data that is not scheduled to be printed will remain on the storage server, resulting in a decrease in the data capacity on the server. Moreover, if a mechanism of allowing a user to delete a document via an operation part is provided, the user will be forced into an action, and thus the operability is hardly good.

It is an object of the present invention to provide an image forming device, an image forming system, and an image forming method that provide, in a pull-print system, greater convenience for users and reduce the capacity of print data stored in a server.

SUMMARY OF THE INVENTION

An image forming device according to the present invention is one capable of communicating with a server storing document data, the image forming device including: a unit detecting that a user has logged in the image forming device; a unit receiving document data stored in the server; a unit performing a printing process on the received document data; a unit determining whether a result of the performed printing process is successful or not; a unit detecting that a user who had been logging in the image forming device has logged out; and a unit transmitting to the server an instruction to delete the document data subjected to the printing process, from the server, when the detection unit detects that the user has logged out after the determination unit determined that the result is successful.

According to the present invention, it is possible to provide an image forming device, an image forming system, and an image forming method that provide, in a pull-print system, greater convenience for users and reduce the capacity of print data stored in a server.

Further features of the present invention will become apparent from the following description of exemplary embodiments (with reference to the attached drawings).

DESCRIPTION OF THE EMBODIMENTS

Hereinafter, the best mode for implementing the present invention will be described using the accompanying drawings.

Embodiment 1

Configuration of an Image Forming System

Figure 1:
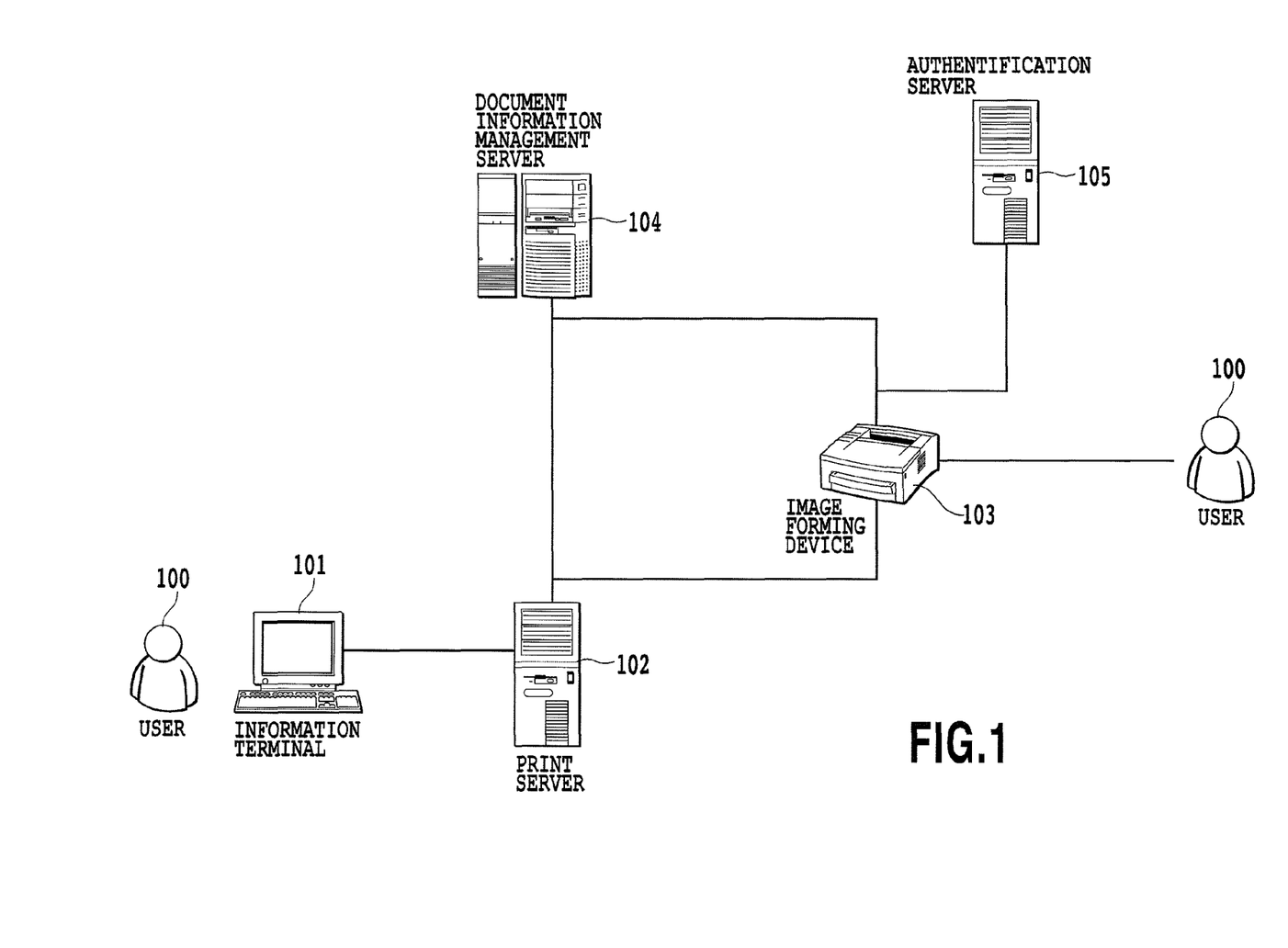
FIG. 1 is a system configuration diagram according to an embodiment.

FIG. 1 is a system configuration diagram showing an example of an overall configuration of an image forming system according to this embodiment.

The image forming system according to this embodiment includes an information terminal 101, a print server 102, an image forming device 103, a document information management server 104, and an authentication server 105, which are connected to be capable of communicating with each other through a network.

The information terminal 101 can transmit a document print job (document data) to the print server 102 in response to an operation via an operation part by a user 100.

The print server 102 is a first server in the image forming system, which stores document data transmitted from the information terminal 101 in association with each user who transmitted it. The print server 102 can input a print job of this document data to the image forming device 103. Moreover, the print server 102 transmits bibliographic information about the document data received from the information terminal 101 to the document information management server 104 as document information. The document information management server 104 is a second server in the image forming system, which stores and manages the received document information.

The image forming device 103 is the one implemented as an MFP, an LBP, or the like. The image forming device 103 can perform the login/logout processing of the user 100 who operates the image forming device 103, using the authentication server 105. Moreover, the image forming device 103 can communicate with the document information management server 104 to perform communication or the like of the commands related to the processing of authentication information about the user 100 (including information, such as a user name or a user ID, for identifying a user) or of a document. The authentication information transmitted from the image forming device 103 to the document information management server 104 is used, for example, in order to search document information associated with the user 100 who is currently logging in, from within the document information management server 104.

The physical connection mode of the devices of this embodiment may be either wired or wireless. The image forming device 103 may be the one retaining a print function, and is not limited to the MFP/LBP. In this embodiment, the image forming system includes one information terminal and one image forming device, but not limited to this, and the image forming system may include a plurality of information terminals or image forming devices. The image forming system includes two servers, but not limited to this, and the image forming system may include only one server having the functions of these servers. Moreover, the print server 102, the document information management server 104, or the authentication server 105 may be of any type having the above-described role, and is implemented in an information processing device, such as a PC or a workstation. Furthermore, the method of authenticating the user 100 in the image forming device 103 using the authentication server 105 may be a unit capable of identifying the user 100, and thus various units for authentication using an IC card, for authentication by the user 100 directly inputting data, for biometrics, and the like are possible.

The basic operation flow in this system can be roughly divided into two flows, i.e., the registration of a document print job in the print server 102 and the printing and deleting of the registered document print job.

The flow of the registration of a document print job is as follows.

1. The user 100 inputs a document print job to the print server 102 via the information terminal 101.

2. The print server 102 stores therein the received document print job, and also transmits the information about the document (e.g., information that uniquely identifies the document, the print setup information, the date data, information of the user who owns the document, or the like) to the document information management server 104.

3. The document information management server 104 stores therein the information about the received document.

The printing and deleting of the registered document print job will be described later in flowcharts of FIGS. 3A, 3B and 4.

Figure 2:
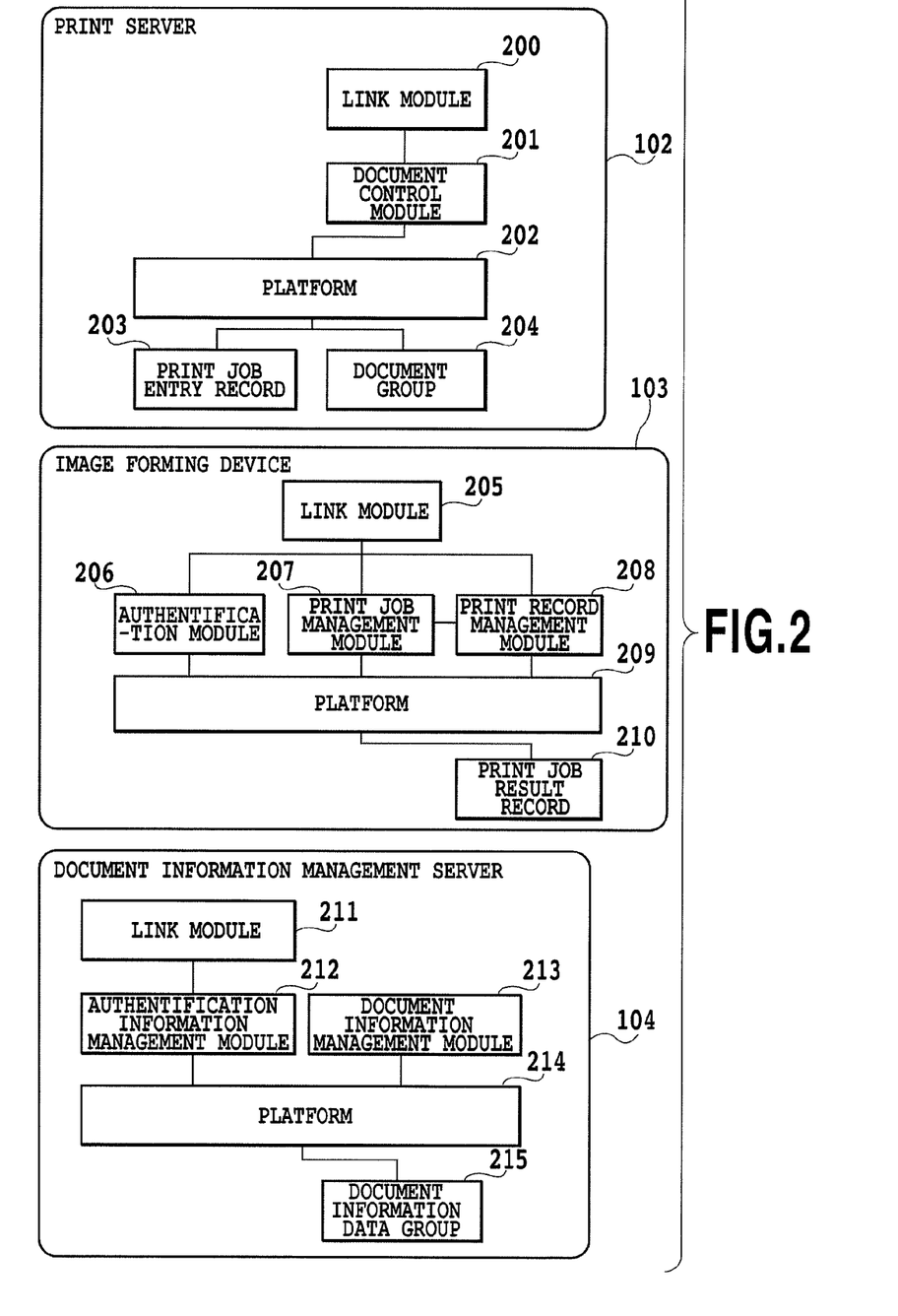
FIG. 2 is a configuration diagram showing the internal configurations of main devices of an image forming system according to an embodiment.

FIG. 2 is an example of a configuration diagram showing the internal configurations of the main devices of the image forming system according to this embodiment. Each configuration is implemented by a software module implemented by a program, hardware such as a circuit, or a combination of these.

The print server 102 includes a link module 200, a document control module 201, a platform 202, a print job entry record 203, and a document group 204 as its components. The link module 200 is a module for performing information communication with an external system. The document control module 201 is a module for controlling the storage, update, deletion, or the like of document data. The platform 202 is a platform for the module group to operate. The print job entry record 203 is the data of a record (including the bibliographic information of document data) that the print server 102 input the stored document data to the image forming device 103 as a print job, or is a storage part for storing this data. The document group 204 is the document data of a print job received from the information terminal 101, or a storage part that stores the data.

The image forming device 103 includes a link module 205, an authentication module 206, a print job management module 207, a print record management module 208, a platform 209, and a print job result record 210 as its components. The link module 205 is a module that performs information communication with an external system. The authentication module 206 is a module that performs the authentication related processing of the user 100 based on an authentication processing result done by the authentication server 105. The print job management module 207 is a module that manages the control of a job to print. The print record management module 208 is a module that manages the record of a job of printing. The platform 209 is a platform for the module group to operate. The print job result record 210 is the data of a result of having performed a print job, or is a storage part that stores this data. Moreover, although not illustrated, the image forming device 103 includes a UI (user interface) including an operation unit, a display panel, or the like for a user to operate the image forming device 103.

The document information management server 104 includes a link module 211, an authentication information management module 212, a document information management module 213, a platform 214, and a document information data group 215 as its components. The link module 211 is a module that performs information communication with an external system. The authentication information management module 212 is a module that stores and manages the authentication information about the user 100 and the authentication information included in document information. The document information management module 213 is a module that stores and manages the document information received from the print server. The platform 214 is a platform for the module group to operate. The document information data group 215 is document information (including the bibliographic information of the document data) received from the print server 102, or is a storage part that stores this information.

Moreover, although not illustrated, the print server 102, the image forming device 103, and the document information management server 104 each include a control part, such as a CPU, and a storage part, such as an HDD or a memory, that stores various kinds of control programs.

[Operation of the Image Forming System]

Figure 3:
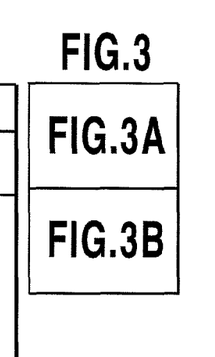
FIG. 3 is a diagram showing the relationship between FIG. 3A and FIG. 3B.
Figure 3A:
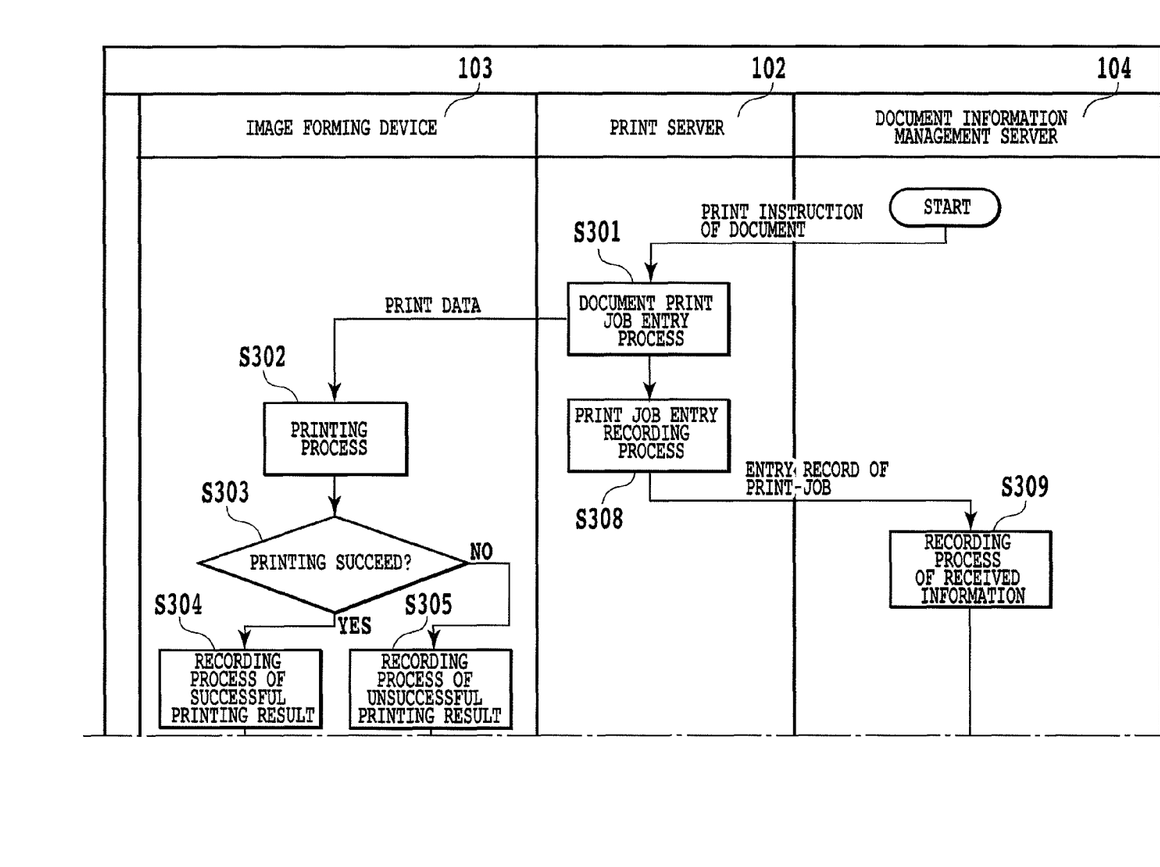
FIG. 3A is a flowchart showing the processing according to an embodiment.
Figure 3B:
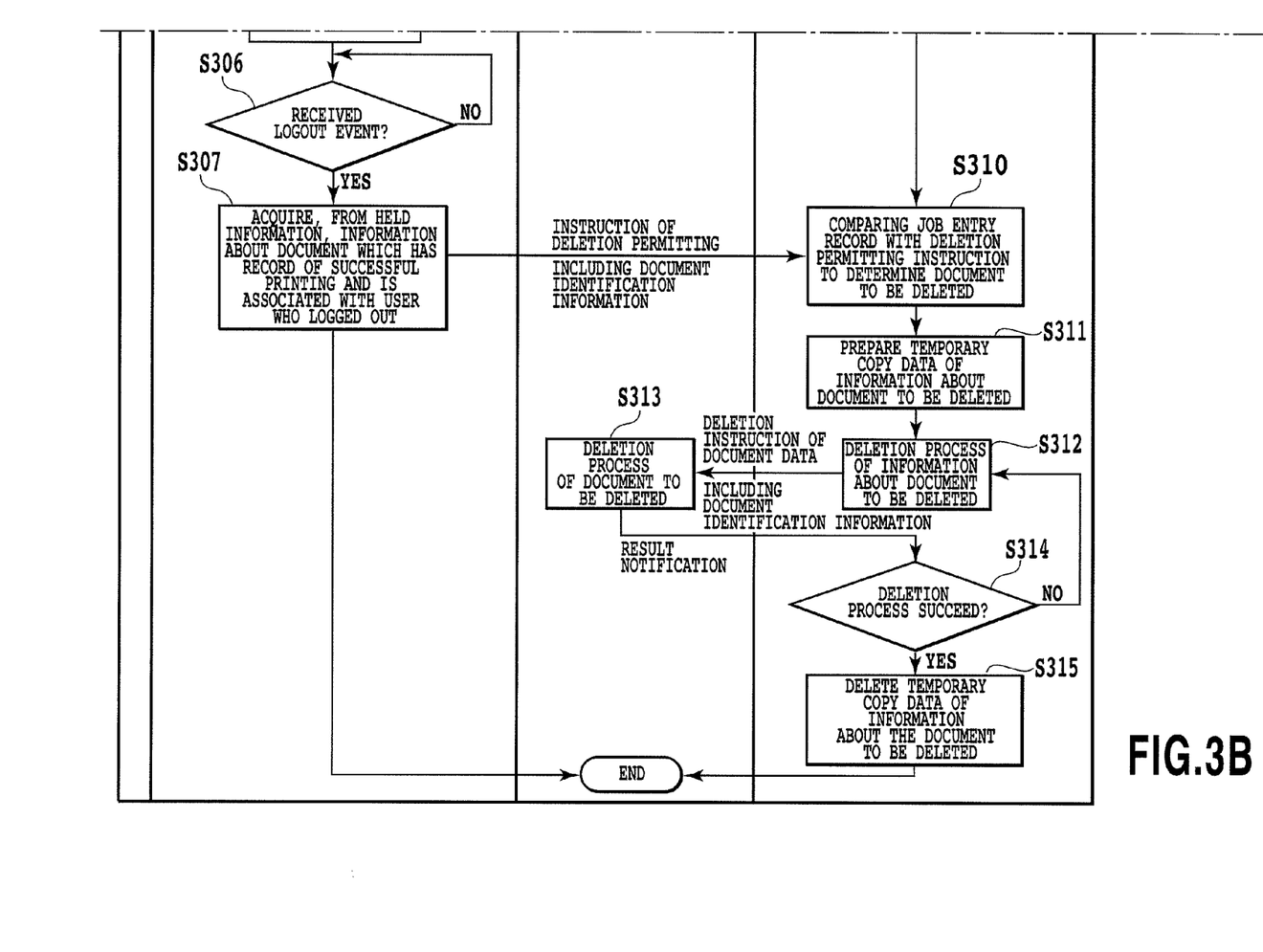
FIG. 3B is a flowchart showing the processing according to an embodiment.

FIGS. 3A and 3B show a flowchart of the processing performed in the print server 102, the image forming device 103, and the document information management server 104 in this embodiment. This flowchart shows a process flow for printing and deleting the document data stored in the print server 102 in the system described in FIG. 1 and FIG. 2. The control of this processing is performed in such a manner that the control part, such as a CPU, included in each of the print server 102, the image forming device 103, and the document information management server 104, reads a control program stored in the storage part included in each of these and executes this program.

The flow starts after the user 100 logs in the image forming device 103 via an operation of the operation part included in the image forming device 103 and identifies a document to be printed from among the document information stored in the document information management server 104. Note that, as an example of a method of identifying a document, specifically, the following method is possible. That is, after the user 100 logs in, the image forming device 103 transmits authentication information of the user 100 (information including user identification information such as a user ID) to the document information management server 104. The document information management server 104 extracts the document information associated with the received authentication information from the document information data group 215. Thereafter, the user 100 identifies desired document information via the operation part from among the above-described extracted document information displayed on a display panel of the image forming device 103.

Next, the document information management server 104 instructs the print server 102 to print the above-described identified document, and the flow proceeds to S301.

In S301, through document print job entry processing, the print server 102 transmits to the image forming device 103 a print job corresponding to the print instruction received from the document information management server 104, and the flow proceeds to S302.

In S302, the image forming device 103 performs a printing process on the print job received from the print server 102, and the flow proceeds to S303.

In S303, the image forming device 103 determines whether the printing process of S302 was successful or not, and if successful, the flow proceeds to S304, and if unsuccessful, the flow proceeds to S305. Note that, the case where the printing process is unsuccessful refers to the case where the relevant document is not printed out properly due to jamming or the like.

Moreover, in this case, whether the printing process was successful or not may be determined by detecting the number of papers output from the image forming device by means of a non-illustrated sensor. For example, when the setting number of papers of a print job is equal to the detected number of output papers, it may be determined that "the printing process was successful."

In S304, the image forming device 103 records the fact that the print result was successful, and stores this record in the storage part included in the image forming device 103 as a print job result record 210, and the flow proceeds to S306.

In S305, the image forming device 103 records the fact that the print result was unsuccessful, and stores this record in the storage part included in the image forming device 103 as the print job result record 210, and the flow proceeds to S306.

In S306, the image forming device 103 monitors a logout event initiated by the user 100, and only when the image forming device 103 receives the logout event, the flow proceeds to S307. Specifically, the authentication module 206 in the image forming device 103 monitors the logout event. Example of actions for the user 100 to log out include the insertion/removal of an ID card to/from a card reader included in the image forming device 103, and a depression of a logout button of the operation part included in the image forming device 103, logout in a timed manner, or the like. When such a logout action is performed, the authentication module 206 detects the logout event. As a logout event notification, the authentication module 206 fires an event to the link module 205.

In S307, in the image forming device 103, only information of a print job corresponding to a successful printing process among the records associated with the user 100 who logged out is extracted from the recording data held in the print job result record 210 via the print record management module 208. Thereafter, the link module 205 transmits to the document information management server 104 a deletion permitting instruction of a document including the information for identifying the extracted print job, and the flow proceeds to S310.

That is, according to the processing of S307, after the printing process performed by the instruction of the user 100 was successful and the user 100 logged out, the image forming device 103 transmits to the document information management server 104 a deletion permitting instruction of a document that was successfully printed.

Figure 6:
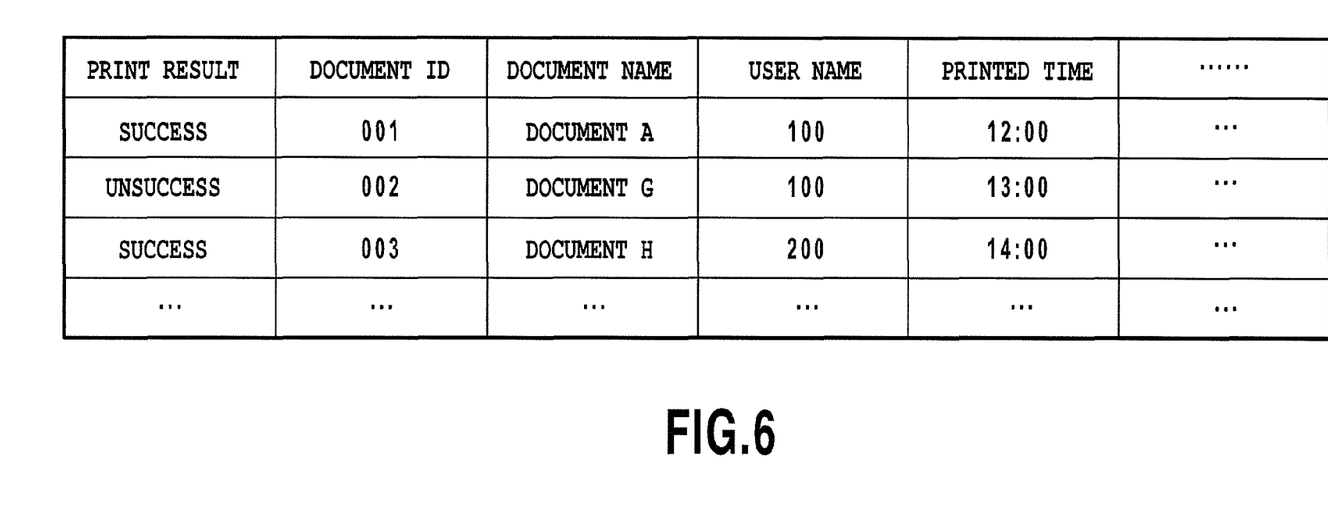
FIG. 6 shows a print job result record according to an embodiment.

FIG. 6 shows an example of the recording data held in the print job result record 210. FIG. 6 shows pieces of information, such as a print result, a document ID, a document name, a user name, a printed time, for each print job. The print result indicates whether the printing process of the relevant print job was successful or not. The document ID is the information for uniquely identifying a print job. The user name is the information for identifying a user associated with the relevant print job (i.e., the user who instructed to perform this print job).

In S308 of FIG. 3A, the print server 102 stores the fact that a print job was input to the image forming device 103 in S301, into the storage part included in the print server 102 as the print job entry record 203. Thereafter, the print server 102 transmits to the document information management server 104 the information of the record that the print job was input to the image forming device 103, and the flow proceeds to S309.

Figure 7:
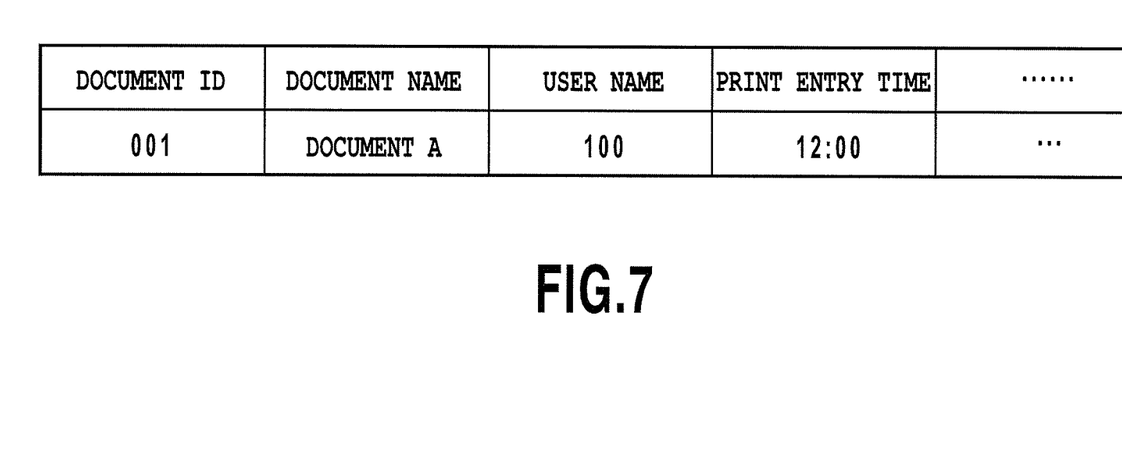
FIG. 7 shows a print job entry record according to an embodiment.

FIG. 7 shows an example of a record that a print job, which the print server 102 transmits to the document information management server 104, was input to the image forming device 103. FIG. 7 shows pieces of information, such as a document ID, a document name, a user name, a print-job entry time, for each print job.

In S309 of FIG. 3A, the document information management server 104 stores the information received from the print server 102 into the storage part included in the document information management server 104 as the document information data group 215, and the flow proceeds to S310.

In S310, the document information management server 104 determines a document to be deleted, based on the deletion permitting instruction received from the image forming device 103 and the record (the document information data group 215) that the print job received from the print server 102 was input to the image forming device 103. Specifically, the document information management server 104 compares the information (e.g., the document ID of FIG. 6) that identifies a document included in the deletion permitting instruction with the information (e.g., the document ID of FIG. 7) that identifies a document included in the record that the print job was input. As a result of the comparison, the print job is input from the print server 102, and also a document, for which the deletion permitting instruction has been issued from the image forming device 103, is determined as the document to be deleted. Thereafter, the flow proceeds to S311.

In S311, the document information management server 104 prepares a temporary copy data of the information of the document to be deleted, which has been determined in S310, and holds this data in the document information data group 215, and the flow proceeds to S312. As described later, this temporary copy data will be held until the document is deleted from the print server 102.

In S312, the document information management server 104 deletes the information about the document, which has been determined to be deleted, from the document information data group 215. Thereafter, the document information management server 104 transmits to the print server 102 an instruction to delete the document data, which has been determined to be deleted, together with the information (e.g., document ID) that identifies the target document, and the flow proceeds to S313. At this point, the document that has been deleted from the document information data group 215 in S312 cannot be referred to from the UI of the image forming device 103.

That is, according to the processing of S312, the document information management server 104 instructs the print server 102 to delete the document, to which the print job was input from the print server 102 and the deletion permitting instruction has been issued from the image forming device 103.

Note that, in S311, the temporary copy data of the document information that has been determined to be deleted is prepared, and in S312 the document information about the document that has been determined to be deleted is deleted, however, the present invention is not limited to this method. For example, instead of copying and deleting the document information that has been determined to be deleted, a flag indicating that the relevant document information is to be deleted may be set.

In S313, the print server 102 deletes the target document in the document group 204 based on the document deletion instruction received from the document information management server 104 (e.g., using the document ID as a key), and notifies the document information management server 104 of this result, and the flow proceeds to S314. That is, the print server 102 receives the document data deletion instruction transmitted from the image forming device 103 via the document information management server 104, and deletes the relevant document data. (In other words, the print server 102 receives the document data deletion instruction from the image forming device 103, and deletes the relevant document data. The print server 102 may receive the document data deletion instruction directly from the image forming device 103.) In S314, the document information management server 104 judges a result of the deletion process received from the print server 102, and if the answer is "NO", the flow returns to S312, and if "YES", the flow proceeds to S315.

In S315, the document information management server 104 deletes the temporary copy data of the document information to be deleted, which was prepared in S311, from the document information data group 215, and then completes the processing flow. Moreover, as described above, if a flag indicating that the document information is to be deleted was set in S311 and S312, the document information, for which this flag is set, is deleted.

In this way, after confirming that the document has been deleted from the print server 102 in S314, the document information management server 104 deletes the temporary copy data of the document information from the document information data group 215 in S315. For this reason, the document information management server 104 can avoid the complete deletion of the document information from the document information data group 215 despite that the document has not yet been deleted from the print server 102.

As described above, according to the processing shown in FIGS. 3A and 3B, in S307 after the printing process was successful and the user 100 logged out, the image forming device 103 transmits to the document information management server 104 a deletion permitting instruction of the document, the printing process of which has been successful. Thereafter, in S312 the document information management server 104 instructs the print server 102 to delete the document, to which the print job was input from the print server 102 and the deletion permitting instruction has been issued from the image forming device 103.

Accordingly, even if the printing process performed by the image forming device 103 was unsuccessful, the document on the print server 102 will not be deleted and therefore the user 100 does not need to perform an operation for registering the document in the print server 102 in order to perform the printing process again. Moreover, the document on the print server 102 will not be deleted until the user 100 logs out. Therefore, even when the user 100 performs the printing process more than once on the same document, the operation for re-registering the document that was registered in the print server 102 once does not need to be performed. Moreover, the capacity for storing documents in the print server 102 can be minimized as compared with such cases where a document is deleted in a predetermined time period, because a document that is not scheduled to be printed is deleted. That is, the image forming system according to this embodiment can provide greater convenience for users and can reduce the capacity of print data stored in the server.

Embodiment 2

Figure 4:
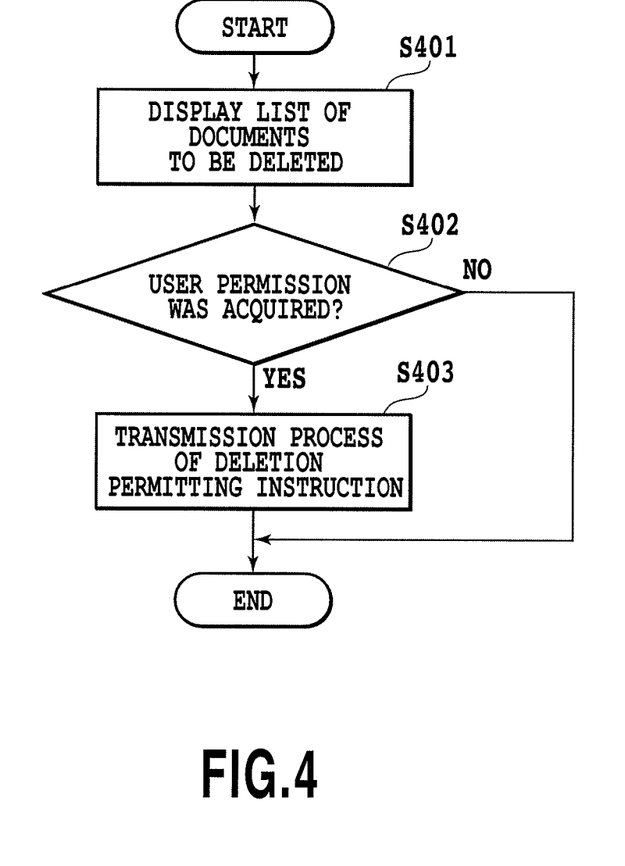
FIG. 4 is a flowchart showing the processing according to an embodiment.

FIG. 4 is an extended flowchart of S307 of FIG. 3B, showing an application embodiment when a document list can be displayed on the UI of the image forming device 103.

This flowchart starts after the image forming device 103 extracts only information of the document, which was successfully printed using a record associated with the user 100 who logged out, from the recording data held in the print job result record 210. Extraction of the relevant document information is performed via the print record management module 208 by the link module 205. An example of the recording data held in the print job result record 210 is as shown in FIG. 6.

The control of this process is performed in such a manner that the control part included in the image forming device 103 reads a control program stored in the storage part included in the image forming device 103, and executes this program.

Figure 5:
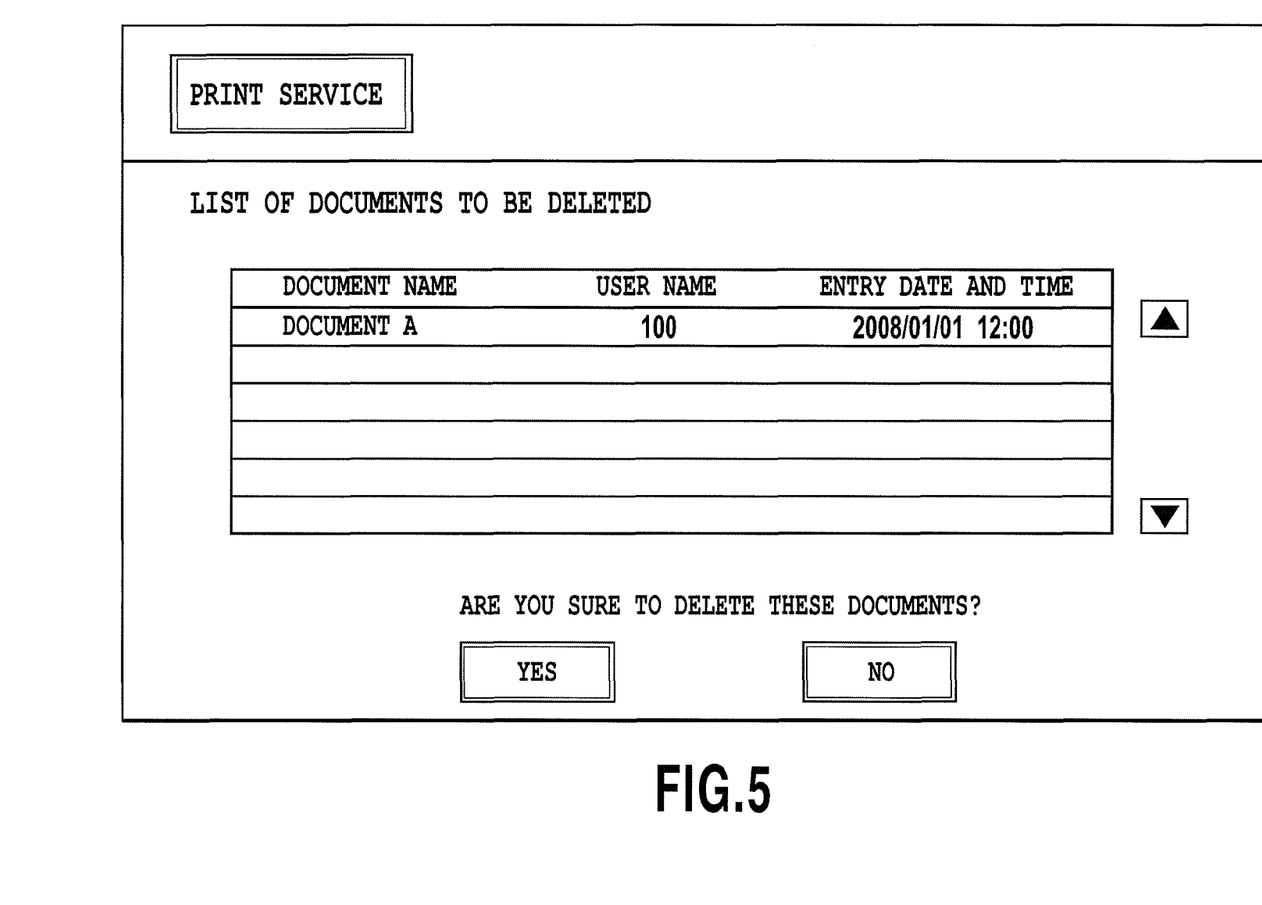
FIG. 5 shows a confirmation screen according to an embodiment.

First, in S401, the image forming device 103 displays a document list to be deleted on the UI included in the image forming device 103 as shown in FIG. 5, and the flow proceeds to S402, and the image forming device 103 waits until it receives an instruction from the user 100.

In S402, if the instruction from the user 100 is the one to permit deletion, the flow proceeds to S403. If the instruction from the user 100 is the one not to permit deletion, the image forming device 103 completes the processing without transmitting the document deletion permitting instruction to the documentation information management server 104.

In S903, the image forming device 103 transmits the document deletion permitting instruction to the documentation information management server 104, and completes the processing.

According to this embodiment, it is also possible to leave a document without deleting the document from the server group, in response to the intention of the user 100, and even after the printing is successfully completed once and the user 100 logs out, this document is present and it is therefore possible to additionally expect an improvement in the convenience for the user, such as that re-printing can be performed.

Moreover, when the information forming device receives a logout event initiated by the user 100 in S306 without determining whether the printing was successful or not in S303 to S305 of FIG. 3A, it may display contents for urging a user to determine whether or not a document, on which the user has performed printing, may be deleted.

This allows the user to confirm the print result, thereby making it possible to determine whether the printing was successful or not and then determine whether this document data may be deleted or not.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-011325, filed Jan. 21, 2009, which is hereby incorporated by reference herein in its entirety.

What is claimed is:

1. An image forming device capable of communicating with a server storing document data, the server being connected to a plurality of the image forming devices, comprising:
  a log-in detection unit detecting that a user has logged in to the image forming device
  a receiving unit receiving document data stored in the server;
  a printing unit performing a printing process on the received document data;
  a determination unit determining whether or not a result of the performed printing process is successful;
  a log-out detection unit detecting that the user who had been logging in to the image forming device has logged out;
  a display unit displaying a list of information only on document data, which is associated with the user detected by the log-out detection unit as having logged out and for which it is determined by the determination unit that a result of the performed printing process is successful; and
  a transmission unit transmitting to the server an instruction to delete document data which is selected from the list of information on document data displayed by the display unit, and not to delete document data which is not selected from the list.

2. The image forming device according to claim 1, wherein the server includes a first server and a second server,
  wherein the first server is a server storing the document data, and
  wherein the second server is a server receiving an instruction to delete the document data.

3. The image forming device according to claim 1, further comprising:
  an ID transmission unit transmitting to the server identification information of the user who is currently logging in to the image forming device; and
  an operation unit,
  wherein document data received by the receiving unit is identified by the operation unit as document data associated with the transmitted identification information.

4. An image forming system comprising a server storing document data and an image forming device, the server being connected to a plurality of the image forming devices, wherein the image forming device comprises:
  a log-in detection unit detecting that a user has logged in to the image forming device;
  a receiving unit receiving document data stored in the server;
  a printing unit performing a printing process on the received document data;
  a determination unit determining whether or not a result of the performed printing process is successful;
  a log-out detection unit detecting that a user who had been logging in to the image forming device has logged out;
  a display unit displaying a list of information only on document data, which is associated with the user detected by the log-out detection unit as having logged out and for which it is determined by the determination unit that a result of the performed printing process is successful; and
  a transmission unit transmitting to the server an instruction to delete document data which is selected from the list of information on document data displayed by the display unit, and not to delete document data which is not selected from the list.

5. The image forming system according to claim 4, wherein the image forming device further comprises:
  an ID transmission unit transmitting to the server identification information of the user who is currently logging in to the image forming device; and
  an operation unit,
  wherein document data received by the receiving unit is identified by the operation unit as document data associated with the transmitted identification information.

6. A method implemented in an image forming device capable of communicating with a server storing document data, the server being connected to a plurality of the image forming devices, the method comprising the steps of:
  a log-in detection step of detecting that a user has logged in to the image forming device;
  receiving document data stored in the server;
  performing a printing process on the received document data;
  determining whether or not a result of the performed printing process is successful;

a log-out detection step of detecting that a user who had been logging in the image forming device has logged out;

displaying a list of information only on document data, which his associated with the user detected by the log-out detection step as having logged out and for which it is determined by the determining step that a result of the performed printing process is successful; and transmitting to the server an instruction to delete document data which is selected from the list of information on document data displayed by the displaying step, and not to delete document data which is not selected from the list.

7. A non-transitory computer-readable recording medium having computer-executable instructions for performing a method performed in an image forming device capable of communicating with a server storing a document, the server being connected to a plurality of the image forming devices, the computer-executable instruction comprising the steps of:

a log-in detection step of detecting that a user has logged in to the image forming device;

receiving document data stored in the server;

performing a printing process on the received document data;

determining whether or not a result of the performed printing process is successful;

a log-out detection step of detecting that a user who had been logging in to the image forming device has logged out;

displaying a list of information only on document data, which his associated with the user detected by the log-out detection step as having logged out and for which it is determined by the determining step that a result of the performed printing process is successful; and transmitting to the server an instruction to delete document data which is selected from the list of information on document data displayed by the displaying step, and not to delete document data which is not selected from the list.

\* \* \* \* \*